United States Patent [19]
Rach et al.

[11] 3,738,408
[45] June 12, 1973

[54] PNEUMATIC TIRE WITH AN ASYMMETRICAL FOLDED BELT

[75] Inventors: Heinz-Dieter Rach; Ekkehard Grollich, Hannover, both of Germany

[73] Assignee: Continental Gummi-Werke Aktiengesellschaft, Hannover, Germany

[22] Filed: Apr. 26, 1971

[21] Appl. No.: 137,422

[30] Foreign Application Priority Data
Apr. 30, 1970 Germany................. P 20 21 268.4

[52] U.S. Cl. ............................................. 152/361 FP
[51] Int. Cl. ................................................ B60c 9/18
[58] Field of Search ....................................... 152/361

[56] References Cited
UNITED STATES PATENTS
3,018,814  1/1962  Saint-Paul.......................... 152/361

FOREIGN PATENTS OR APPLICATIONS
1,435,170  12/1966  France............................... 152/361

Primary Examiner—Gerald M. Forlenza
Assistant Examiner—George H. Libman
Attorney—Walter Becker

[57] ABSTRACT

A pneumatic vehicle tire with a folded belt having a layer of pull resistant strength members, which is folded over in a direction transverse to the circumferential direction of the tire so that there will be a fold on each tire side while the free end portions of said belt overlap each other, the overlapping sections being spaced from that plane of symmetry which is perpendicular to the axis of rotation of the tire and also being spaced from the adjacent fold.

5 Claims, 6 Drawing Figures

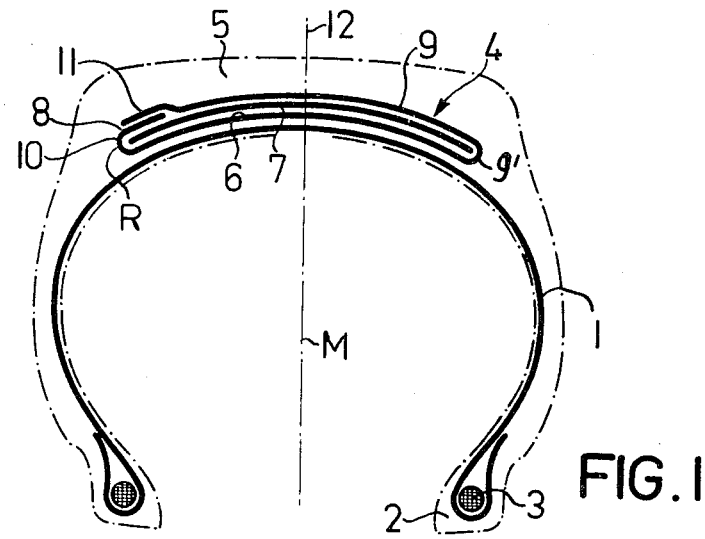
FIG.1
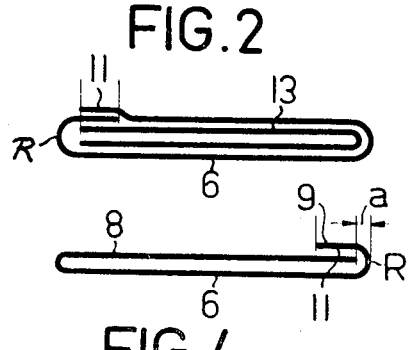
FIG.2  FIG.3
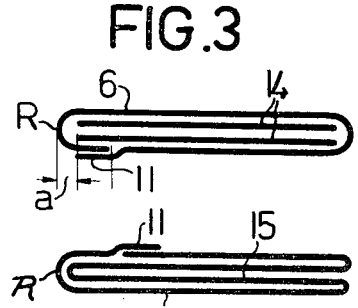
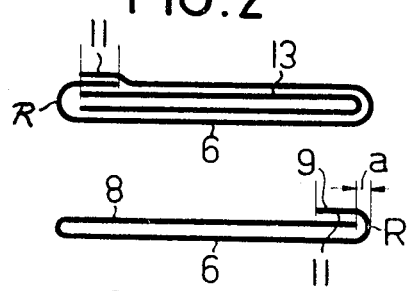
FIG.4  FIG.5
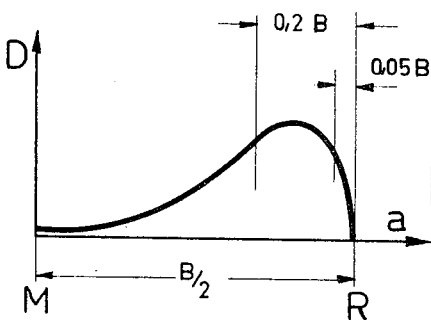
FIG.6
INVENTORS
HEINZ-DIETER RACH
EKKEHARD GROLLICH
BY

PNEUMATIC TIRE WITH AN ASYMMETRICAL FOLDED BELT

The present invention relates to a pneumatic vehicle tire with folded belt which has at least one layer with parallel threads, cords, or the like strength members, which layer is in the longitudinal direction thereof folded over in such a way that the two folded edges overlap each other.

With heretofore known pneumatic vehicle tires of this kind, the overlapping area of the two folded over edges is arranged centrally with regard to the belt of the tire. As a result thereof, a considerable consolidation and hardening of the tire belt in the central portion thereof is obtained and thus also below the central portion of the tread surface. Such an arrangement may have a disadvantageous effect upon the dynamic softness of the pneumatic tire.

It is, therefore, an object of the present invention to to design pneumatic tires of the above referred to type that, in contrast to heretofore known tires, the dynamic softness of the tire belt will not be affected within the region of the belt center and that the endurance strength of the belt will be increased.

This object and other objects and advantages of the invention will appear more clearly from the following specification in connection with the accompanying drawing, in which:

FIG. 1 shows a section through a portion of a pneumatic vehicle tire according to the invention.

FIGS. 2–5 respectively illustrate different modifications of folded belts for pneumatic vehicle tires according to the invention.

FIG. 6 is a graph for the endurance strength as dependent on the location of the overlapping area with regard to the distance from the center of the belt toward its edge.

The pneumatic vehicle tire according to the invention with a folded belt comprising a layer of pull-resistant threads, cords, or the like strength members, which layer is in the longitudinal direction thereof so folded that the two folded over edges overlap each other while this layer may surround one or more additional layers, is characterized primarily in that the overlapping area is arranged in spaced relationship to the center of the belt and in spaced relationship to the belt edge. Preferably, the overlapping area is spaced from the belt edge in such a way that the distance therebetween amounts to about from 0.05 – 0.2 times the width of the belt. It is self-understood that generally an overlapping width of from 10 to 20 mm will be sufficient and desirable.

It has been found that a considerable increase in the endurance strength of the tire belt is obtained when the overlapping area is, in contrast to heretofore known tires, arranged in spaced relationship to the central portion of the belt. However, this strength is greatest when the overlapping area is arranged in spaced relationship to one of the two belt edges. The thus designed pneumatic tires are particularly well suited for high speed tires.

Referring now to the drawing in detail, the carcass 1 of the pneumatic tire comprising primarily rubber or rubber-like materials has pull-resistant threads or the like strength members which extend at a right angle to the circumference of the tire. These strength members are wound around the tire cores 3 in the tire beads 2 and there are anchored. The tire belt 4 is provided between the carcass 1 and the tread strip 5 of the pneumatic tire. The tire belt 4 is a pull-resistant ring which extends substantially over the width of the tread strip 5 and comprises primarily parallel threads, wires or cords which in the individual planes are parallel to each other but which cross each other when viewing two superimposed planes. The pull-resistant threads or the like of belt 4 preferably form an angle of from 5 to 30° with the circumferential direction of the tire.

Belt 4 according to FIG. 1 comprises two layers 6, 7. The sections 8 and 9 of the layer 6, which during the manufacturing process is first laid out flat, are while enclosing layer 7 folded over so as to form folding edges 10. These folding edges 10 extend in the circumferential direction of the tire in such a way that an overlapping 11 results which has a width of about 10 mm. It is important in this connection that the overlapping at 11 is located in spaced relationship to the central plane 12 of the tire and also in spaced relationship to the adjacent folding edge 10.

According to the folding belt of FIG. 2, again a layer 6 is employed, but in this instance the layer 6 surrounds a layer 13 which is folded in U-shaped manner.

According to the embodiment of FIG. 3, the overlapping area 11 is located on the inner circumference of belt 4, and layer 6 surrounds two layers 14 which extend in transverse direction; according to the embodiment of FIG. 4, belt 4 is formed exclusively by a layer 6 with the two sections 8 and 9.

With the embodiment of FIG. 5, again one layer 6 only is provided which layer is doubled between the inner and outer sections at 15.

In the graph of FIG. 6 there is plotted on the ordinate the endurance strength D and on the abscissa the distance $a$ of the overlapping area 11 (away from the center M — plane 12 —) of belt 4 from its adjacent edge R at 10.

As will be seen from the graph, the endurance strength is highest when the overlapping area 11 is located outside the plane 12 while it has a distance $a$ from the edge R or the folding edge 10 which amounts to from 0.05 to 0.2 times the width B of the belt.

It is particularly advantageous with tires according to the embodiments shown in the drawing, in other words with tires in which the overlapping area 11 is arranged eccentrically with respect to the plane of symmetry of the tire, to arrange that edge 9' of the belt which faces away from the overlapping area 11 in such a way that, with a positive camber of the vehicle tire, it is located at that edge of the belt which faces away from the vehicle, whereas, with a negative camber of the vehicle tire, edge 9' is so arranged that it is located at that edge of the belt which faces toward the vehicle.

It is, of course, to be understood that the present invention is, by no means, limited to the particular constructions shown in the drawing but also comprises any modifications within the scope of the appended claims.

It is furthermore to be understood that the term "strength members" as it appears in the specification and claims includes threads, cables, strands and wires.

What we claim is:

1. A pneumatic vehicle tire especially of radially belted type which includes in combination: a carcass, a tread strip, and a folded belt interposed between said tread strip and said carcass, said belt being folded in longitudinal direction so that at least one fold is located on one side of that plane of symmetry radially centrally of said tire which is perpendicular to the axis of rotation of said tire while another fold is located on the other side of the said plane of symmetry, the free end portions of said folded belt overlapping each other, and said overlapping portions being located on the said other side of and in spaced relationship to the said plane of symmetry, said overlapping portions being closer to said other fold than to said plane of symmetry.

2. A tire in combination according to claim 1, in which said overlapping portions are spaced from a belt edge of said other fold by a distance equalling about from 0.05 to 0.2 times the width of said folded belt.

3. A tire in combination according to claim 2, in which the overlapping portions equals approximately the distance of said overlapping portions from the belt edge of said other fold.

4. In combination: two vehicle wheels each having mounted thereon a tire especially of radially belted type comprising a carcass, a tread strip and a folded belt interposed between said tread strip and said carcass, said belt being folded so that at least one fold is located on one side of that plane of symmetry radially centrally of the respective pertaining tire which is perpendicular to the axis of rotation of said pertaining tire while another fold is located on the other side of the said plane of symmetry radially centrally of said pertaining tire, the free end portions of each folded belt of each tire overlapping each other in such a way that the overlapping portions of one and the same folded belt are located on the said other side of and in spaced relationship to the said plane of symmetry of the respective pertaining tire, said overlapping portions being closer to said other fold than to the pertaining last mentioned plane of symmetry, the arrangement in combination being such that with the vehicle wheel having a positive camber the said one fold faces away from said vehicle and with the vehicle wheel having a negative camber the said one fold faces toward said vehicle.

5. A tire in combination according to claim 1, in which said folded belt has pull resistant atrength members therein.

* * * * *